United States Patent

Suzuki et al.

[11] Patent Number: 6,065,231
[45] Date of Patent: May 23, 2000

[54] MOTOR DRIVE METHOD AND DRIVE CIRCUIT

[75] Inventors: Yuzuru Suzuki; Sakae Fujitani; Yoshiyuki Aono, all of Shizuoka-ken, Japan

[73] Assignee: Minebea Co., Ltd., Nanago-ken, Japan

[21] Appl. No.: 09/015,339

[22] Filed: Jan. 29, 1998

[30] Foreign Application Priority Data

Jan. 31, 1997 [JP] Japan ................................... 9-018250

[51] Int. Cl.[7] ...................................................... H02P 8/00
[52] U.S. Cl. ............................ 38/700; 318/724; 318/696
[58] Field of Search ................................... 318/138, 254, 318/439, 685, 696, 700, 701, 702, 720, 721, 722, 724

[56] References Cited

U.S. PATENT DOCUMENTS

| | | | |
|---|---|---|---|
| 3,740,629 | 6/1973 | Kohlhagen | 318/138 |
| 4,087,732 | 5/1978 | Pritchard | 318/696 |
| 4,349,867 | 9/1982 | Otsuka et al. | 363/160 |
| 5,043,642 | 8/1991 | Ohi | 318/254 |
| 5,296,793 | 3/1994 | Lang | 318/715 |
| 5,504,404 | 4/1996 | Tamaki et al. | 318/432 |
| 5,825,151 | 10/1998 | Ikawa et al. | 318/685 |

*Primary Examiner*—Bentsu Ro
*Attorney, Agent, or Firm*—Townsend and Townsend and Crew LLP

[57] ABSTRACT

There is disclosed a synchronous motor drive in which in a record disc drive of an information recording device a quantity of generated excitation noise is reduced to a small level to which a reading/writing signal is not influenced and a substantial motor generation torque is prevented from lowering. An absolute value of a maximum voltage gradient of a coil excitation voltage waveform is set to a certain value or less. The waveform alternates at a synchronous frequency which is determined by the number of poles of a rotating magnetic field produced in an air gap by a stator winding and the number of revolutions.

8 Claims, 10 Drawing Sheets

RELATIONSHIP BETWEEN VOLTAGE GRADIENT AND EXCITATION NOISE

FIG. 9

RELATIONSHIP BETWEEN VOLTAGE GRADIENT AND TORQUE

MOTOR DRIVE METHOD AND DRIVE CIRCUIT

BACKGROUND OF THE INVENTION

1. Field of the Invention

The present invention relates to a drive method of a spindle motor for driving a record disc of an information recording device and a drive circuit, particularly to a drive voltage waveform of a synchronous motor and a voltage waveform for excitation of a coil. Specifically, the invention relates to a motor excitation voltage waveform which can minimize excitation noises superimposed on a signal from a reading/writing head built in a device without reducing a torque generated by a spindle motor.

2. Description of the Prior Art

In a recent electronic circuit an excitation voltage (waveform) can be produced optionally from a low-voltage DC power supply. Therefore, a drive system including a synchronous motor may be a superior constitution for economical reasons. Especially, in a constitution where a low-voltage two-phase claw-pole stepping motor is used as the synchronous motor, a position detector and a speed detector are unnecessary. The motor constitution itself is simple. This motor drive system may be constituted most inexpensively.

However, among the synchronous motors, a large-sized motor requiring much power is driven by a commercial power supply (AC sinusoidal wave voltage). On the other hand, a small-sized/low-voltage motor which may be used in an information recording device or the like has the rated number of revolutions which may be determined optionally for the convenience of an associated device, or has to rotate and drive a record medium directly (without using a retardation mechanism) for precision. Therefore, it is difficult to adjust the number of revolutions with the commercial power supply, which cannot be used. Instead, by using a DC power supply an excitation voltage waveform is generated which has a phase number/voltage/frequency required for an electronic circuit. In many cases, the excitation voltage waveform is of a square wave (rectangular wave).

When the excitation voltage waveform is of a square wave, at an excitation switching point being a rise/fall portion of the waveform (the point where in case of a bipolar excitation the excitation is switched from positive to negative or from negative to positive and in case of a unipolar excitation the excitation is switched from ON to OFF or from OFF to ON, so-called commutation point) a voltage gradient (voltage change in a unit time) becomes remarkably steep. Accordingly, a spike voltage, so-called excitation noise arises in a motor coil. Especially, in the claw-pole stepping motor in which a large solenoid coil is formed, since the coil itself has a large inductance, the excitation noise is enlarged as much. A portion of the excitation noise is transmitted as an electromagnetic wave in air, electromagnetically interlinked with a reading/writing head in the information recording device and superimposed on a signal voltage. Also, another portion is transmitted via a power supply line and superimposed directly on the signal voltage in the head. In either case, the excitation noise disadvantageously deteriorates an S/N ratio of the signal voltage in the device. In the worst case, the excitation noise changes the signal voltage. A critical disadvantage may occur that information is wrongly read/written.

To solve the problem, as a method of minimizing excitation noises by devising the excitation voltage waveform without changing the motor constitution, the voltage gradient of the excitation voltage waveform is minimized. In this method, the excitation noise is surely lowered, but a power supplied to the motor (especially, a voltage component which causes the motor to generate an effective torque) is also lowered. As a result, the motor generation torque is disadvantageously decreased.

Thus, the motor excitation voltage waveform, especially the voltage gradient, is an important factor in the information recording device for securely accessing (reading/writing) information. Therefore, demanded is an excitation voltage waveform which causes the excitation noise as little as possible and does not lower the motor generation torque. However, a quantitative technique for satisfying the demand has not been found yet.

On the other hand, since a conventional constitution of a brushless DC motor has a small coil inductance and a long commutation cycle, the excitation noise itself causes relatively little problem. Also, since a commutation timing is determined by detecting a rotor position, the generation torque depends primarily on a mounting error (precision) of a position detector and depends relatively less on the excitation waveform itself. The generation of excitation noise and the lowering of generation torque which are dependent on the excitation voltage waveform (especially, voltage gradient) hardly occur. However, in the conventional brushless DC motor, a drive circuit is complicated and various detectors are necessary, thereby increasing the cost. The problem is that the prior art cannot meet a present request for cost saving.

As aforementioned, when the synchronous motor is used for the information recording device, the entire system can be constituted inexpensively. However, for the aforementioned reason, the commercial power supply cannot be used for the excitation voltage. Therefore, the excitation voltage waveform with necessary voltage/phase number/frequency must be produced by using an electronic circuit technique. However, the produced excitation voltage waveform, especially the waveform voltage gradient, has much influence on the quantity of the generated excitation noise and the motor generation torque. Specifically, when the voltage gradient is small, the excitation noise is minimized, but the motor torque is also reduced. On the other hand, when the voltage gradient is enlarged, the motor torque can be enlarged, but the excitation noise is also increased. Such contradictory relationship is present.

SUMMARY OF THE INVENTION

An object of the invention is to provide a motor drive method which generates a small level of excitation noise to a degree to which a reading/writing signal of a device is not influenced and which prevents a substantial motor generation torque from being lowered.

When a synchronous motor is driven, the generation of excitation noise can be suppressed by setting to a certain value or less an absolute value of a maximum voltage gradient of a coil excitation voltage waveform alternating at a frequency (hereinafter referred to as the synchronous frequency) which is determined by the number of poles of a rotating magnetic field in an air gap produced by a stator winding (generally, in the synchronous motor having a permanent magnet on a rotor the number of poles of the rotating magnetic field produced by one phase of a stator is equal to the number of poles of the permanent magnet on the rotor) and the number of revolutions. Also, by obtaining a certain value or more as the absolute value of the maximum voltage gradient (especially, the maximum voltage gradient occurring at the voltage rise/fall portions before and after commutation), the lowering of the motor generation torque can be suppressed. Specifically, when the excitation voltage is represented by v(t) relative to a time t for driving at the number of revolutions n (rps), the synchronous motor having the number of poles P (poles) of the rotating magnetic field produced at substantially equal pitches in the air gap by the stator winding, then the waveform of the excitation voltage v(t) is a continuous waveform, being not a sinusoidal waveform or a square wave. The continuous waveform exists between the sinusoidal wave and the square wave which both have the maximum value of voltage amplitude Vm(V) and the synchronous frequency n·P/2(Hz) and which are equal to each other in phase. Then, by setting the absolute value of the voltage gradient at an optional time in a range which does not exceed 8π·Vm·n·P(V/s), the generation of the excitation noise accompanying a steep change in the excitation voltage is suppressed. Also, by setting the absolute value of the maximum voltage gradient at the voltage waveform rise/fall portions before and after commutation to 2π·Vm·n·P(V/s) or more, the electric energy for generating the effective torque is prevented from lowering. The torque decrease can be minimized.

Consequently, a drive with less excitation noises imposed on a signal voltage of a reading/writing head and with a good S/N ratio can be constituted, while a motor drive method which can sufficiently secure a motor generation torque can be provided.

DETAILED DESCRIPTION OF THE PREFERRED EMBODIMENTS

The invention will now be described with reference to the accompanying drawings.

Figure 1A:
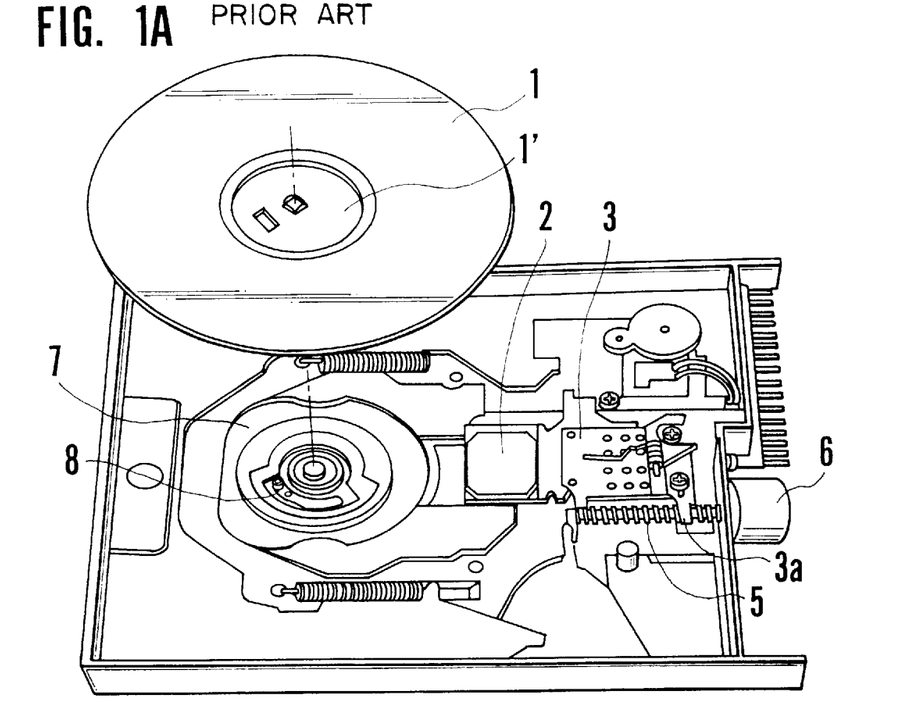
FIG. 1A is a perspective view showing a main portion of an information recording device to which the invention is applied, with a record disc detached therefrom.
Figure 1B:
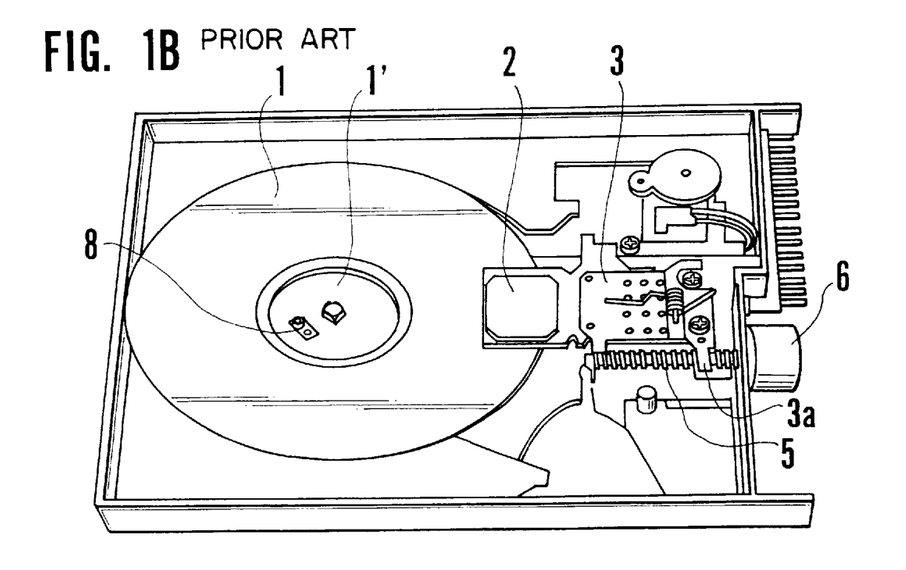
FIG. 1B is a perspective view showing the main portion of the information recording device with the record disc mounted thereon.

In the following, as an example of an information recording device according to the invention, a 3.5 inch FDD (floppy disc drive) is described. In FIGS. 1A and 1B, for the convenience of description, only a necessary portion of the 3.5 inch FDD is schematically shown. FIG. 1A is a schematic representation in which a record disc is detached, and FIG. 1B is a schematic representation in which the record disc is mounted.

In FIGS. 1A and 1B, numeral 1 denotes a disc-shaped magnetic record medium for recording information (hereinafter referred to as the record disc). Magnetic particulates are applied to a surface and a rear face of the record disc 1. In a central portion of the record disc 1 an iron chucking hub 1' having a configuration of a plate with two holes therein is inserted. The record disc 1 is in whole contained in a plastic case (not shown) in such a manner that a record medium face is protected and portability is enhanced.

Reference number 2 denotes a magnetic head for accessing information on the record disc 1. Specifically, when the magnetic head 2 contacts the record disc 1, the information recorded on the record disc 1 is read as a magnetic change in magnetic particles. Also, for writing, by giving a magnetic change to the magnetic particles on the record disc 1, information is written. Specifically, the magnetic head 2 with a coil built therein reads and writes information into and from the record disc 1.

Reference number 3 is a head carriage with the magnetic head 2 mounted thereon. The magnetic head 2 is mounted on a tip end of the head carriage. The head carriage 3 is a mechanism for linearly moving the magnetic head 2 to an appropriate position (track) on the record disc 1, and constituted of an actuator motor 6 and a screw 5 for converting a rotational movement to a linear movement. To convert the rotational movement to the linear movement, a nut 3a partially attached to the head carriage 3 is engaged in a groove in the screw 5. When the screw 5 rotates, the head carriage 3 in whole moves linearly. In this manner, in accordance with a position command given to the actuator motor 6 (determined by the number of pulses transmitted to the actuator motor 6), the magnetic head 2 can be appropriately moved to an optional track position of the record disc 1.

Reference number 7 is a spindle motor for rotating the record disc 1. In the embodiment, a synchronous motor is used. On a tip end of a rotation axis of the spindle motor 7 attached is a chucking mechanism 8 for rotating and stably holding the iron chucking hub 1' in the central portion of the record disc 1. As a result, the record disc 1 stably rotates while being clamped by the chucking mechanism 8 of the spindle motor 7.

First, described is the disc driving spindle motor 7 for use in the invention which is constituted of a two-phase clawpole stepping motor, a type of the synchronous motor with a permanent magnet.

Figure 2:
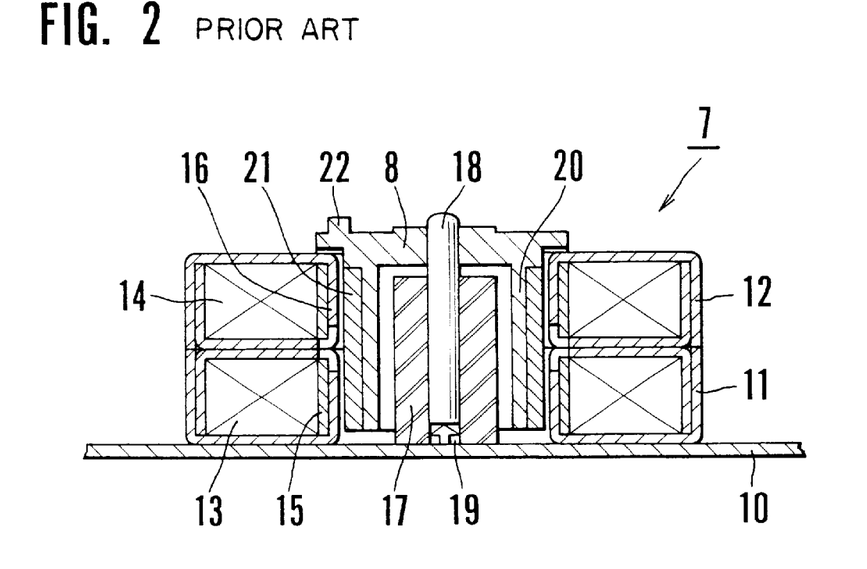
FIG. 2 is a sectional view of an inner rotor motor.

FIG. 2 is a sectional view of an inner rotor motor. The motor is mounted on a substrate 10. In the motor on the substrate 10 two stator yokes 11 and 12 are overlapped, and inside the stator yokes 11 and 12 stator coils 13 and 14 are housed, respectively. A central portion of the stator yokes 11 and 12 is formed in a cylindrical configuration, and on side walls thereof pole teeth 15 and 16 are formed. In the center of a cylindrical space formed inside the stator yokes 11 and 12, a bearing 17 is built on the substrate 10. A rotation axis 18 is rotatably supported by the bearing 17. A lower end of the bearing 17 is rotatably supported by a thrust bearing 19 on the substrate 10. To an upper end of the rotation axis 18 a cup-shaped rotor 20 is attached. A rotor magnet 21 is fixed to the rotor 20 so as to be opposed to the pole teeth 15 and 16. An upper portion of the rotor 20, i.e. the bottom of the cup configuration, forms the chucking portion 8 for holding the chucking hub 1' of the record disc 1. Reference number 22 denotes a pin engaging in a hub hole in the record disc 1.

Figure 3:
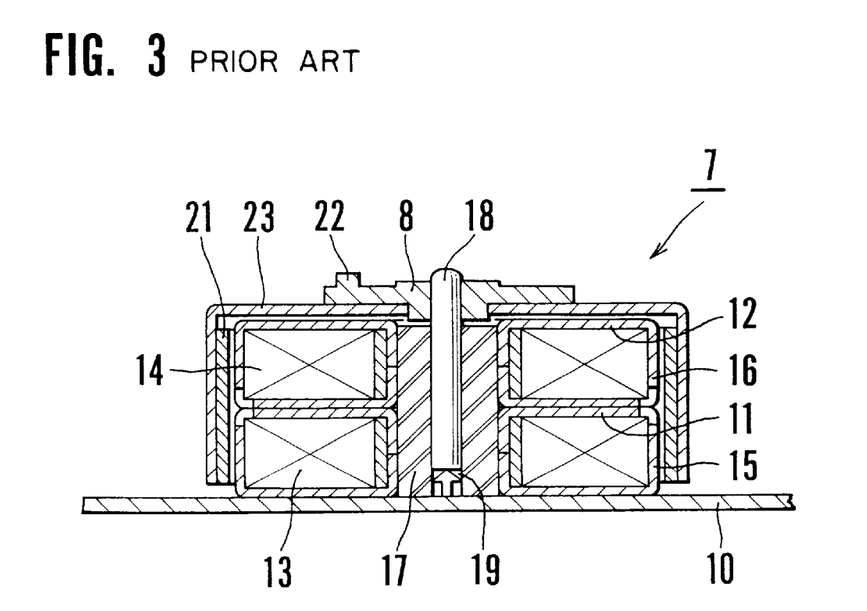
FIG. 3 is a sectional view of an outer rotor motor.

FIG. 3 is a sectional view of an outer rotor motor. In a motor structure, the same constitutional portions as those shown in FIG. 2 are denoted with the same codes, and the description thereof is omitted if unnecessary.

In the same manner as in FIG. 2, the motor is mounted on the substrate 10. On the substrate 10 two stator yokes 11 and 12 are overlapped, and inside the stator yokes 11 and 12 stator coils 13 and 14 are disposed, respectively. The central portion of the stator yokes 11 and 12 is formed in a cylindrical configuration. In the center of the cylindrical space the bearing 17 is built on the substrate 10. The rotation axis 18 is rotatably supported by the bearing 17. The lower end of the bearing 17 is rotatably supported by the thrust bearing 19 on the substrate 10. On side walls outside the stator yokes 11 and 12, the pole teeth 15 and 16 are formed. To the upper end of the rotation axis 18 a cup-shaped rotor 23 is attached. The rotor magnet 21 is fixed to the rotor 23 so as to be opposed to the pole teeth 15 and 16. An upper portion of the rotor 23, i.e. the bottom of the cup configuration, forms the chucking portion 8 for holding the chucking hub 1' of the record disc 1. Reference number 22 denotes the pin engaging in the hub hole in the record disc 1.

In the embodiment the inner rotor or outer rotor stepping motor of the claw-pole type with the permanent magnet on the rotor has been described, but the invention is not restricted to the embodiment. The motor may have no rotor position detector. In the motor, a rotating magnetic field is generated at equal pitches in an air gap by a stator winding. Synchronously with the rotation magnetic field, the rotor rotates. Specifically, the invention can be applied to any synchronous motor. For example, a hybrid stepping motor, a permanent magnet synchronous motor disclosed in the patent application laid-open No. Hei 7-313861 or the like is available. Also, the invention can be adapted to a VR (variable reluctance) stepping motor using no permanent magnet or an action (reluctance) synchronous motor. Further, in the motor with the permanent magnet on the rotor (the claw-pole stepping motor or the permanent magnet synchronous motor), the number of poles of the rotating magnetic field produced at equal pitches in the air gap by one phase of stator winding is, as aforementioned, usually equal to the number of magnetic poles of the rotor magnet. However, this does not apply to the permanent magnet synchronous motor disclosed in the patent application laid-open No. 7-313861. In this case, considered is an alternating voltage of a synchronous frequency which is determined by the number of poles of the rotating magnetic field produced in the air gap by the stator winding and the number of revolutions.

In the following, the claw-pole stepping motor used as the spindle motor is described.

Operation of the spindle motor 7 will now be described. When the record disc 1 is rotated and driven (information is accessed) by using the motor with the aforementioned constitution, the spindle motor can be driven in the same manner as a usual stepping (synchronous) motor. Specifically, the stator coils 13 and 14 of the motor may be provided with the excitation frequency which is determined by the number of revolutions, the number of poles on the rotor magnet and the excitation mode, i.e. the excitation voltage of the synchronous frequency. The voltage may be applied by switching excitation of the stator coil at an appropriate time with a transistor or the like in such a manner that the rotating magnetic field with a desired speed can be formed.

Figure 4:
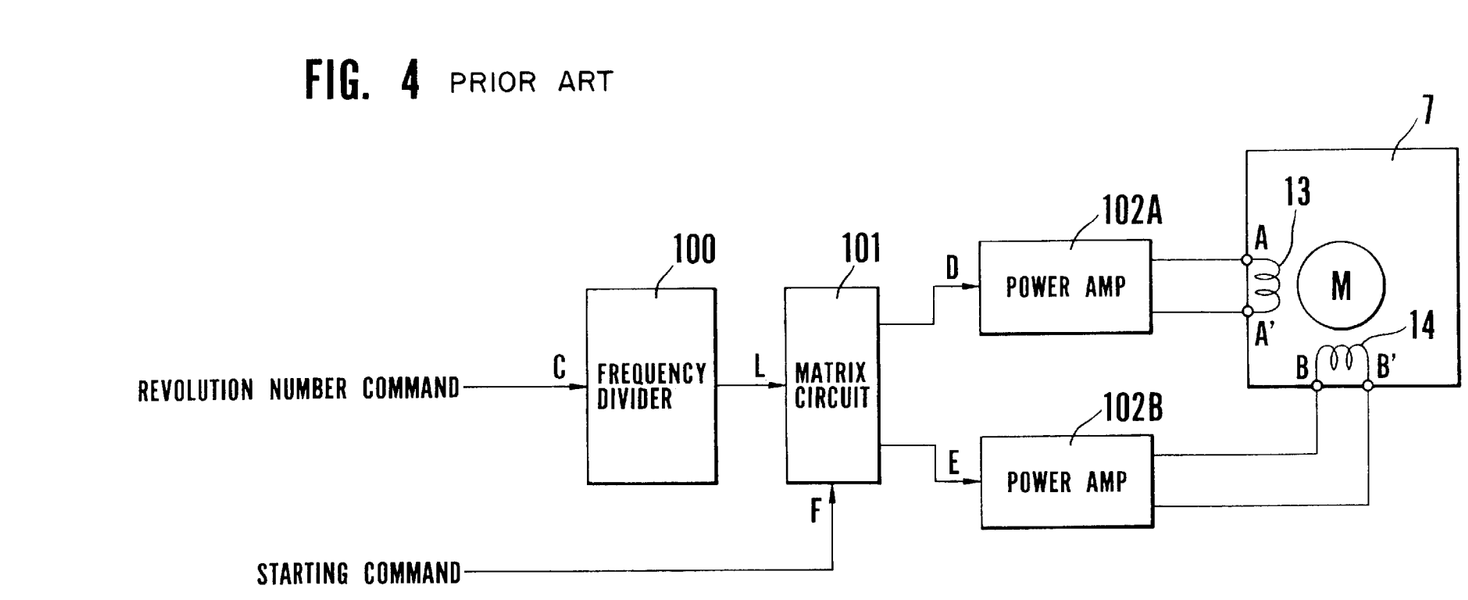
FIG. 4 is a circuit diagram showing a conventional record disc drive circuit.
Figure 5:
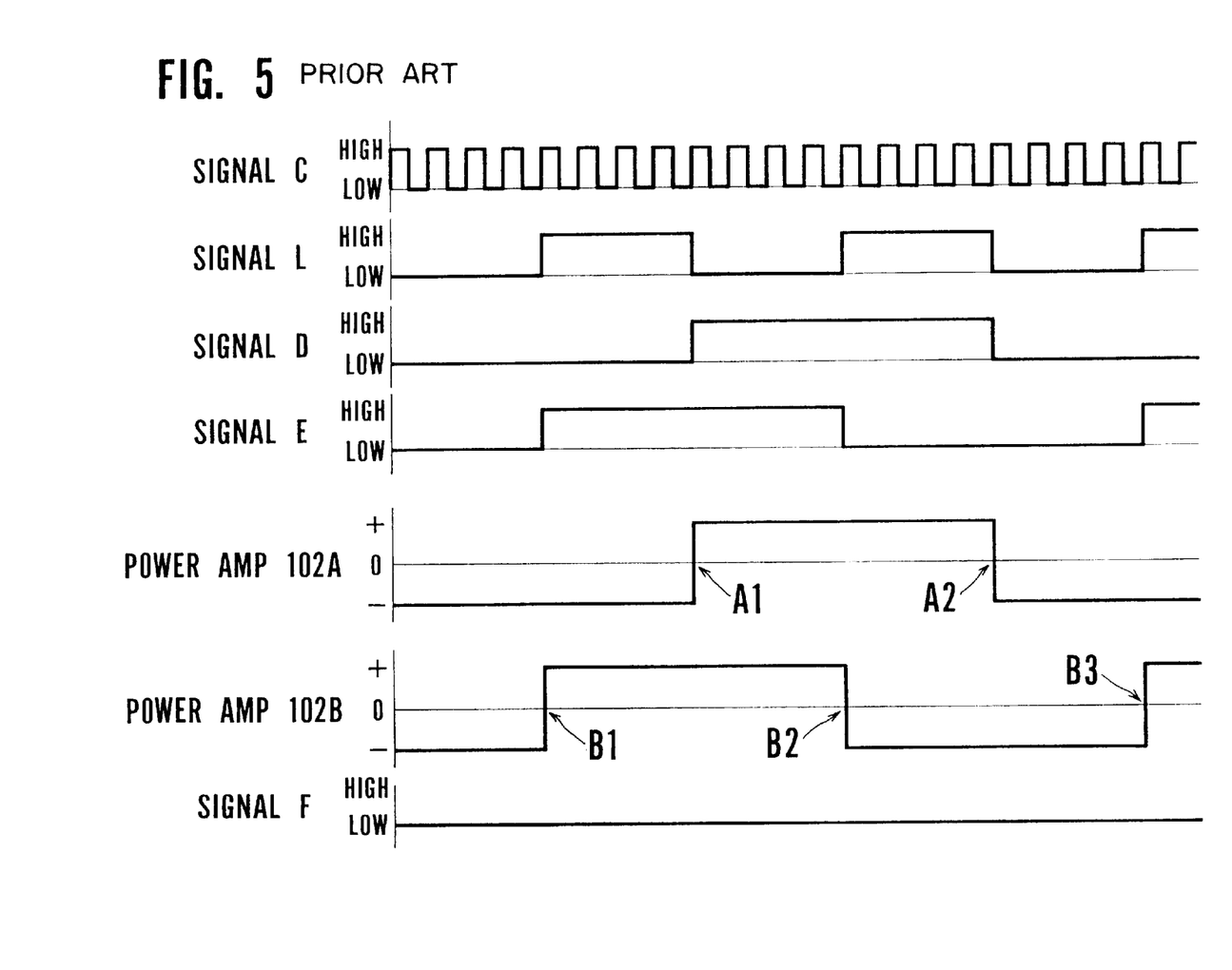
FIG. 5 is a time chart of the conventional circuit shown in FIG. 4.

A conventional concrete circuit diagram is shown in FIG. 4 and its timing chart is shown in FIG. 5. The figures show a high polar driving of the two-phase claw-pole stepping motor.

In FIG. 4, a revolution number command is divided by a frequency divider 100, and a matrix circuit 101 generates a two-phase bipolar signal. One output of the matrix circuit 101 is transmitted to a power AMP 102A and another output is transmitted to a power AMP 102B. Further, the power AMP 102A is connected to the stator coil 13 in the spindle motor 7, while the power AMP 102B is connected to the stator coil 14, so that a necessary power is supplied to the spindle motor 7. FIG. 5 shows the timing chart.

A signal C represents a motor revolution number command. In the embodiment, the command for a rated revolution number of 300 rpm is of a 3840 Hz pulse. A signal L is an output of the frequency divider 100 which is obtained by dividing the signal C by ⅛.

A signal D is obtained by further dividing the signal L by ½.

Similarly, a signal E is obtained by dividing the signal L by ½, but different in phase from the signal D by an electric angle of 90 degrees. In FIG. 5, the signal E advances ahead of the signal D in phase by 90 degrees.

An output of the power AMP 102A is of a phase-A excitation voltage waveform, and operates at the same timing as the signal D. However, since the bipolar operation is performed, a negative voltage is generated (in an exciting direction from A' to A of the phase-A coil 13) when the signal D is low, and a positive voltage is generated (in an exciting direction from A to A' of the phase-A coil 13) when the signal D is high.

An output of the power AMP 102B is of a phase-B excitation voltage waveform, and operates in the same manner as the phase-A excitation voltage waveform. Specifically, when the signal E is low, a negative voltage is generated (in an exciting direction from B' to B of the phase-B coil 14). Also, when the signal E is high, a positive voltage is generated (in an exciting direction from B to B' of the phase-B coil 13). Additionally, a phase difference between the phase-A excitation voltage waveform and the phase-B excitation voltage waveform is also 90 degrees in the electric angle.

A starting command F is a signal for starting/stopping the motor. In the embodiment, the signal indicates the stopping of the motor when it is high, and indicates the starting of the motor when it is low.

In the conventional timing chart of FIG. 5, the excitation voltage waveform is shown in square waves. When the excitation voltage waveform is of square waves, however, voltage gradients at excitation switching points (A1, A2 and B1, B2, B3 in FIG. 5) are remarkably large, thereby increasing the generation of excitation noise. The excitation noise superimposed on the signal voltage in the reading/writing head 2 lowers the S/N ratio of the signal voltage as aforementioned.

Figure 6A:
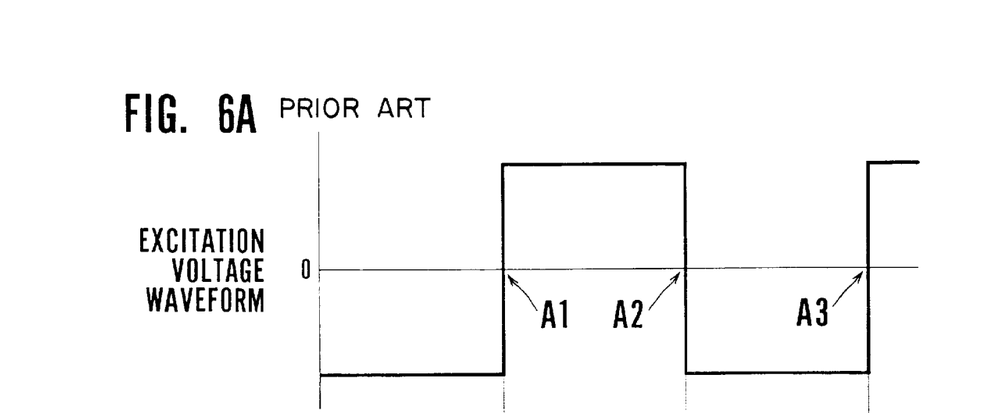
FIG. 6A shows an excitation voltage waveform a square wave for use in a conventional drive method.
Figure 6B:
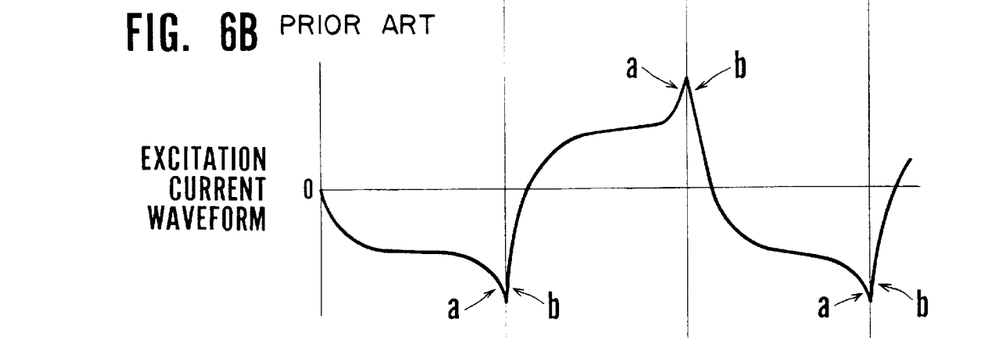
FIG. 6B shows an excitation current waveform.
Figure 6C:
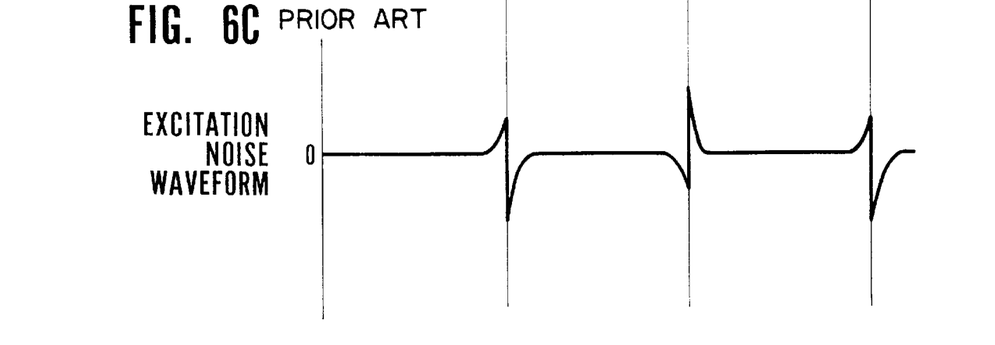
FIG. 6C shows an excitation noise.

FIGS. 6A to 6C show a relationship between an excitation current and an excitation noise in the prior art where the excitation voltage is of a square wave. These figures show one phase of the excitation voltage. When the phase is the same as the other phase in magnetic coupling (both phases are usually set the same), the phases are only deviated while the relationship is the same. Therefore, the description is omitted.

FIG. 6A shows a square excitation voltage waveform. FIG. 6B shows an excitation current waveform corresponding to FIG. 6A, and FIG. 6C shows an excitation noise (voltage) waveform corresponding to FIG. 6B. As seen from FIG. 6B, in the excitation current waveform a current largely changes at excitation switching points (A1, A2 and A3 in FIG. 6A). Specifically, immediately before the commutation (portion a in FIG. 6B) and immediately after commutation (portion b in FIG. 6B) steep gradient portions are generated. At the commutation, the current gradient reverses. The current gradient of the portion a is generated because a back electromotive force (hereinafter referred to as the BEMF) in the coil is lowered, but the excitation voltage applied to the coil is maintained constant (as the square wave). Also, in the portion b after the commutation, the polarity of the excitation voltage reverses. Thereby, the BEMF in the coil and the polarity of the excitation voltage are added (at this moment the coil BEMF and the excitation voltage coincide with each other in polarity). As a result, in the portion b the excitation current suddenly changes.

In FIG. 6C, the excitation noise (noise voltage) is proportional to the product of the excitation current gradient and the coil inductance. Therefore, at the commutation points the excitation noise becomes remarkably large. Additionally, since at the commutation point the current gradient reverses, before and after the commutation point the polarity of the excitation noise (voltage) also reverses. A peak to peak value of the excitation noise (voltage) is very large.

Thus, when the excitation voltage is of a square wave, the voltage gradient at the time of commutation becomes steep. At every commutation a spiked excitation noise occurs, which deteriorates the S/N ratio of the signal voltage.

Figure 7:
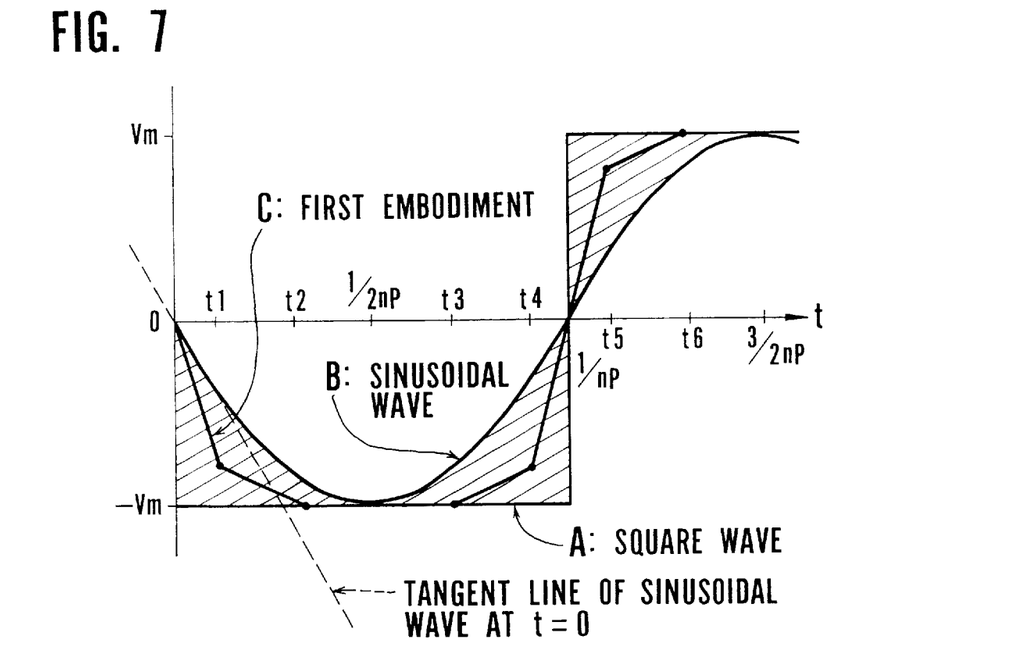
FIG. 7 is an explanatory view of an excitation voltage waveform for use in a drive method according to a first embodiment of the invention.

FIG. 7 shows an embodiment according to a first aspect of the invention, and is a diagram of an excitation voltage pattern including a first embodiment (waveform C in FIG. 7). FIG. 7 shows one phase of two-phase bipolar drive, and an enlarged excitation voltage waveform during time t from 0 to 3/2nP(s). Further, the number of motor revolutions n(rps) is 5 rps in the embodiment, and the number of poles P of the magnet on the rotor is 48 poles in the embodiment. Additionally, the number of poles of the rotor magnet P=48 (poles) is equal to the number of poles of the rotating magnetic field produced in the air gap by one phase of stator coil. Also, time t=1/nP(s) indicates a half cycle of the excitation voltage, and is about 4.17 ms in the embodiment. The maximum value of the excitation voltage Vn(V) is 6V in the embodiment.

In FIG. 7, a square wave A shows a conventional excitation voltage waveform, a sinusoidal wave B shows a commercial power supply waveform, and a waveform C shows an excitation voltage waveform according to the first embodiment of the invention. The waveform C of the invention is in a region (crosshatched in FIG. 7) surrounded by the conventional square excitation voltage waveform A and the sinusoidal commercial power supply waveform B. Further, the absolute value of the voltage gradient at an optional time is $8\pi \cdot Vm \cdot n \cdot P(V/s)$ (eight times the gradient (broken line in FIG. 7) of the sinusoidal commercial power supply waveform B at t=0) or less. The phase of the square wave A is equal to that of the sinusoidal wave B. When the square wave A is equal in phase to the sinusoidal wave B, as shown in FIG. 7, timings when the excitation voltage reverses between positive and negative (coincidence of a zero cross moment) are the same.

Also, in the excitation voltage waveform C according to the invention, before and after times t1, t2, t3, t4, t5 and t6, the voltage gradient differs. In the invention, the larger absolute value of the voltage gradients before and after each time is used as the voltage gradient of the time. Further, even during the times t2 and t3 when the waveform C overlaps with the square wave A (or the sinusoidal wave B), it is inside the surrounded or crosshatched region.

Specifically, in FIG. 7 the absolute value of the gradient of the waveform C reaches a maximum value during time 0 to t1, t4 to 1/nP and 1/nP to t5. The maximum value is $8Vm \cdot n \cdot P$ (about 11.5V/ms), which is smaller than $8\pi \cdot Vm \cdot n \cdot P(V/s)$ (about 36.2V/ms). It is natural that the waveform C exists in the crosshatched region at all the times.

Figure 8:
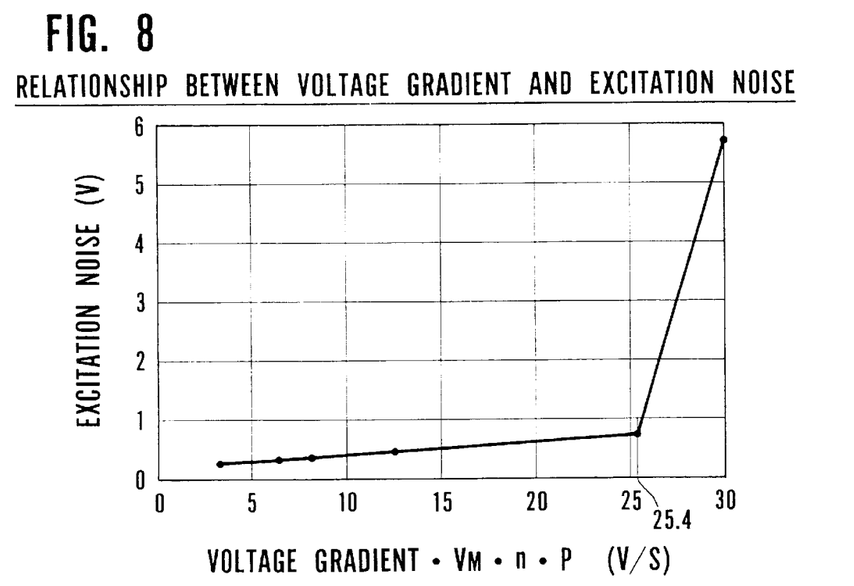
FIG. 8 shows measurement results of a quantity of excitation noise superimposed on a reading head of a device relative to a maximum value of an excitation voltage gradient.

FIG. 8 shows measurement results of a quantity of an excitation noise superimposed on the reading head of the device relative to the maximum value of the excitation voltage gradient. In an experiment, as the excitation voltage waveform an equal leg trapezoidal wave was used. By changing a gradient of a leg, the maximum absolute value of the excitation voltage gradient was varied (a method of generating the excitation voltage is later described). As a result, as seen from FIG. 8, the excitation noise of the square wave is 5.75V, while that of the trapezoidal wave is 0.75V at the voltage gradient of the trapezoidal leg $25.4Vm \cdot n \cdot P$ (about 36.6V/ms). It is seen that the excitation noise is remarkably reduced. Also, it is found from the experiment that the practical level of the excitation noise superimposed on the head is preferably 1V or less. With an allowance the maximum absolute value of the excitation voltage gradient is set to $8\pi \cdot Vm \cdot n \cdot P(V/s)$ (about 36.2V/ms in the embodiment) or less, which is sufficiently effective. If this value or less is set, as seen from FIG. 8, the level of the excitation noise is more preferably decreased gradually.

Figure 9:
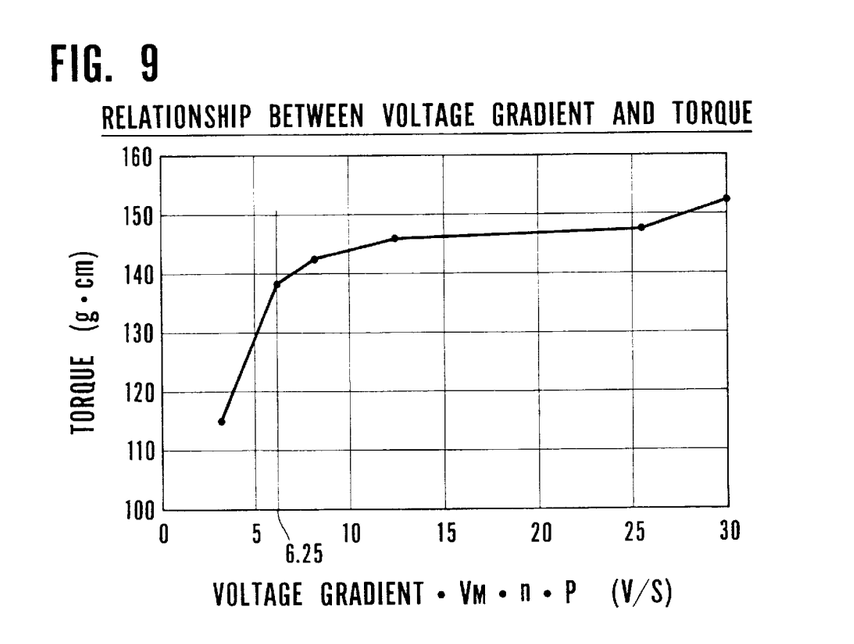
FIG. 9 shows a relationship between the maximum value of the excitation voltage gradient and a motor generation torque.

As measurement results of an experiment according to a second aspect of the invention, FIG. 9 shows a relationship between the maximum value of the excitation voltage gradient and a motor generation torque. In the experiment, in the same manner as the experiment of FIG. 8, as the excitation voltage waveform an equal leg trapezoidal wave was used and the gradient of the leg was changed. As a result, it is found that the larger the voltage gradient is, the larger the motor generation torque is (in the embodiment a pull-out torque is evaluated). However, when the voltage gradient is reduced, the torque is rapidly decreased. This is because when the excitation voltage gradient becomes smaller, the voltage components for generating an effective torque are also reduced. Therefore, to maintain the motor generation torque at a certain constant value or more, the excitation voltage gradient needs to be set to a certain value or more.

With an allowance placed on FIG. 9, the voltage gradient is set to $6.25Vm \cdot n \cdot P \approx 2\pi \cdot Vm \cdot n \cdot P$ (about 9.0V/ms), which is twice the gradient (4.52V/ms) in the case of the sinusoidal wave.

As seen from FIGS. 8 and 9, to suppress the excitation noise in the drive and to prevent the motor generation torque from lowering, the maximum absolute value of the excitation voltage gradient (without considering a sign) is set to 8π·Vm·n·P (about 36.2V/ms in the embodiment) or less. Also, the excitation voltage gradient (especially, the gradient of the rise/fall portion of the excitation voltage before and after commutation, which determines an effective power) is set to 2π·Vm·n·P (about 9.0V/ms in the embodiment) or more. These set values are advantageous in that the excitation noise is reduced and the generation torque is secured.

Figure 10:
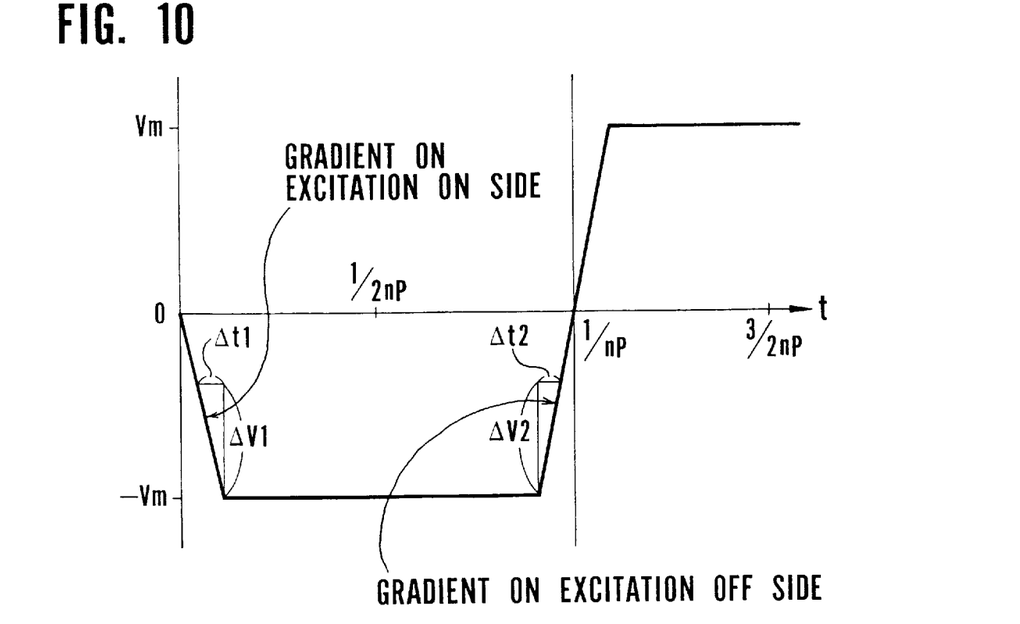
FIG. 10 is an explanatory view of an excitation voltage waveform for use in a drive method according to a second embodiment of the invention.

FIG. 10 shows a second embodiment of a waveform for use in the invention, in which an equal leg trapezoidal excitation voltage waveform is used. As shown in FIG. 10, an absolute value ΔV1/Δt1=10Vm·n·P of a rise voltage gradient (the negative voltage has a rise/fall portion reverse to that of a positive voltage, and an excitation ON timing is represented) is 14.4V/ms in the embodiment, which satisfies the aforementioned condition (about 9.0V/ms or more and about 36.2V/ms or less). On the other hand, an absolute value ΔV2/Δt2=10Vm·n·P of a fall voltage gradient (the negative voltage has a rise/fall portion reverse to that of the positive voltage, and an excitation OFF timing is represented) is similarly 14.4V/ms in the embodiment. Thus, the excitation voltage waveform satisfies the aforementioned condition (about 9.0V/ms or more and about 36.2V/ms or less). Further, the excitation voltage waveform of FIG. 10 is in the crosshatched region surrounded by the square wave A and the sinusoidal wave B at any optional time as shown in FIG. 7. Thereby, also in the second embodiment the excitation noise is suppressed and the lowering of the motor generation torque is minimized (referring to FIGS. 8 and 9). Since there is an allowance for the torque, only to suppress the excitation noise, the voltage gradient of the rise/fall portion can be decreased to Δ·Vm·n·P. On the other hand, if there is no allowance for the motor torque, the voltage gradient may be set slightly larger than 2Δ·Vm·n·P.

Figure 11:
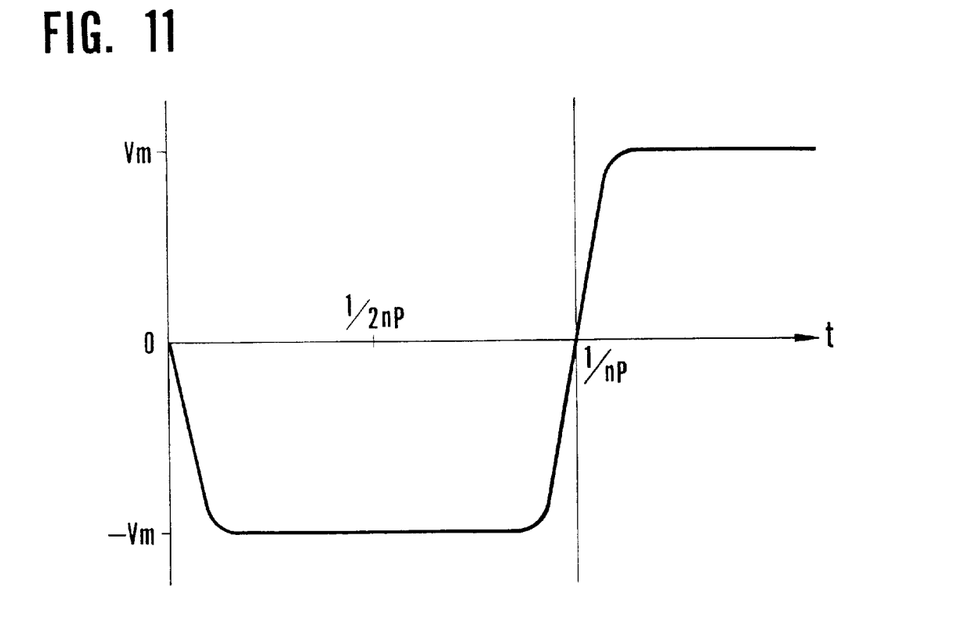
FIG. 11 is an explanatory view of an excitation voltage waveform for use in a drive method according to a third embodiment of the invention.

FIG. 11 shows a third embodiment of a waveform for use in the invention. FIG. 11 shows an example of a pan-bottom-shaped waveform which is obtained by smoothing corners of the equal leg trapezoidal waveform. Such excitation waveform is acceptable as long as it satisfies the aforementioned condition for the maximum (absolute) value of the voltage gradient of the rise/fall portion in the excitation waveform at an optional time. Additionally, when the radii of curved corner portions of the waveform are as small as possible, the lowering of the effective torque can be advantageously minimized.

Figure 12:
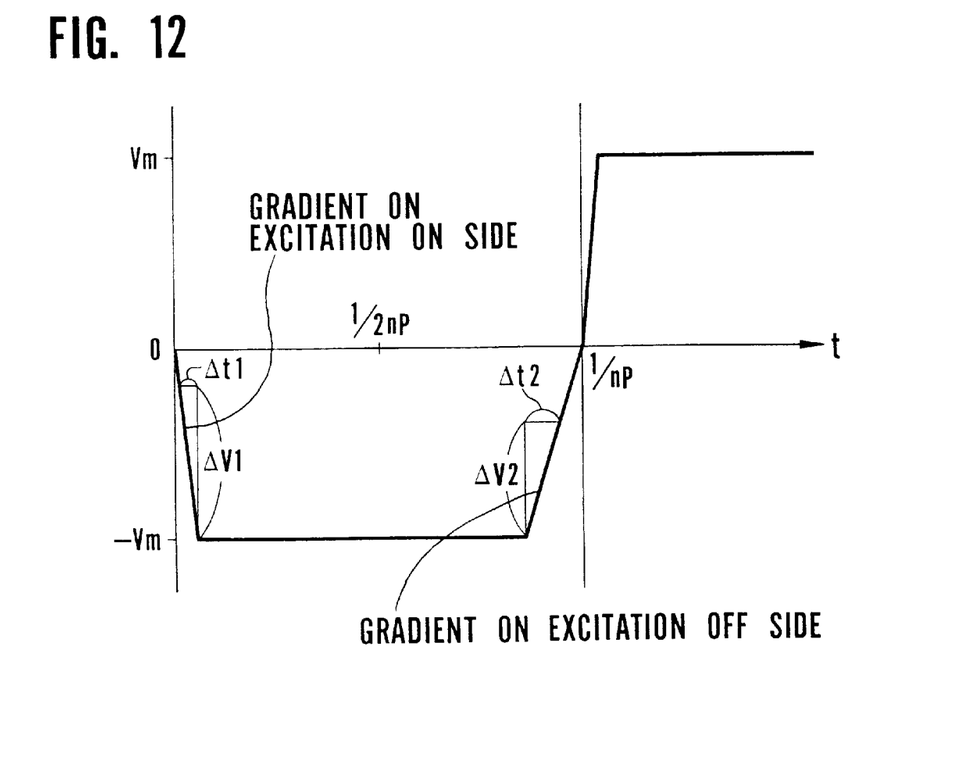
FIG. 12 is an explanatory view of an excitation voltage waveform for use in a drive method according to a fourth embodiment of the invention.

FIG. 12 shows a fourth embodiment of a waveform for use in the invention.

The embodiment represents an unequal leg trapezoidal waveform. The voltage rise gradient (absolute value) on the excitation ON side is 20Vm·n·P (28.8V/ms in the embodiment). On the other hand, the fall gradient on the excitation OFF side is 6.7Vm·n·P (about 9.65V/ms in the embodiment). In this manner, within a range which meets the foregoing condition, by setting the voltage gradient of the excitation voltage rise portion larger than the gradient of the fall portion, the lowering of the motor generation torque can further be minimized. Additionally, the voltage gradient of the excitation voltage rise portion (on the excitation ON side) is set larger than the voltage gradient of the fall portion (on the excitation OFF side) by using a property of coil inductance. Specifically, when the voltage is steeply applied at the time of rising, the current gradient is enlarged accordingly, but the inductance influences and restricts in such a manner that the quantity of generated excitation noise is not increased (changes smoothly). Therefore, by setting the voltage gradient of the rise portion larger to some degree than that of the fall portion, the generation of the effective torque is expedited without increasing the excitation noise. Alternatively, by chamfering corner portions in the same manner as FIG. 11, the unequal leg trapezoidal waveform with a pan bottom configuration can be formed. FIGS. 7, 10, 11 and 12 show the first to fourth embodiments of the waveforms used in the invention, and show one phase each of the excitation voltage waveforms. It is natural that the motor is excited at the excitation voltage which has a phase difference of 90 degrees in the electric angle in case of two phases or a phase difference of 120 degrees in the electric angle in case of three phases. For the coil excitation, the bipolar excitation has been described. The invention is effective in the same manner for a unipolar excitation.

Figure 13:
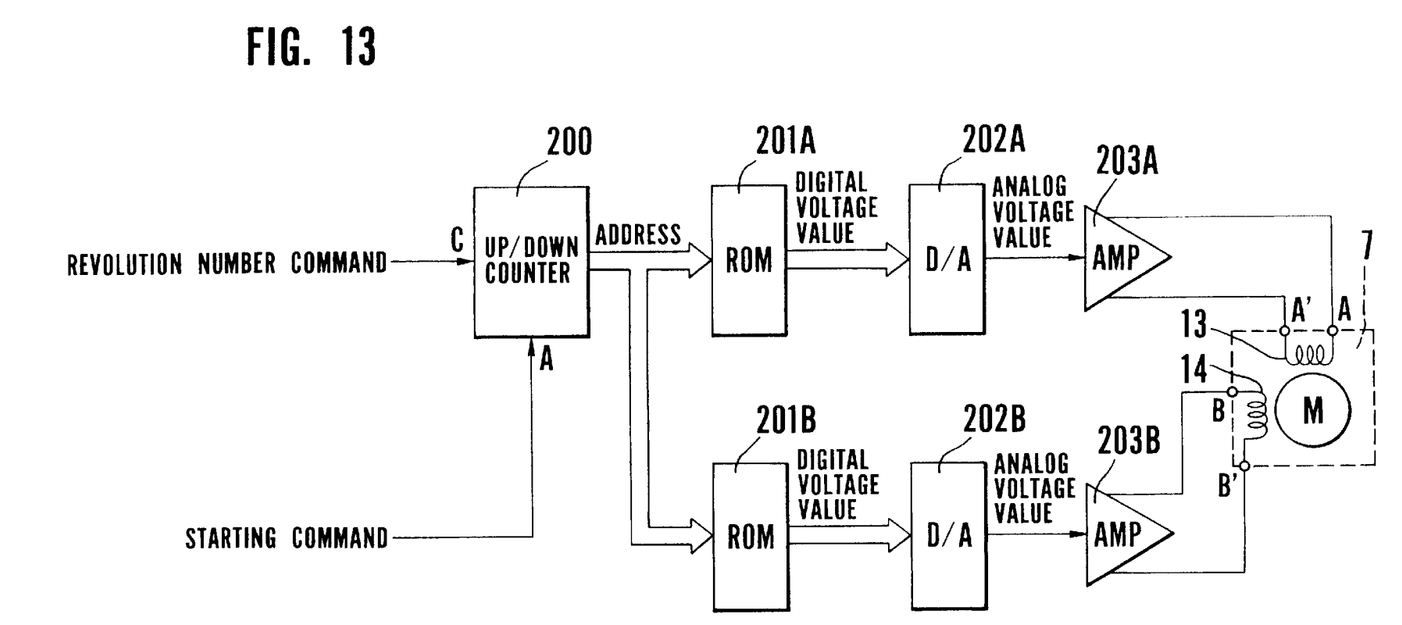
FIG. 13 is a block diagram showing an embodiment of an excitation voltage waveform generation circuit for use in the drive method according to the invention.

Finally, FIG. 13 is a block diagram of an excitation voltage waveform generation circuit for use in a drive method according to an embodiment of the invention. In FIG. 13, the spindle motor 7 with the stators 13 and 14 is the same as the conventional spindle motor shown in FIG. 4.

In the embodiment, a revolution number command C and a starting command A are used as input signals. The embodiment is constituted of an UP/DOWN counter 200, ROM 201A and 201B, D/A converters 202A and 202B, and power amplifiers 203A and 203B. An excitation voltage waveform (especially, a rise/fall portion of the excitation voltage waveform) can be set with information stored in the ROM 201A and 201B as described later.

First, the UP/DOWN counter 200 counts up (counts down at the time of reversing) in accordance with a pulse rate of the revolution number command C. Counted values are used as input addresses of the ROM 201A and 201B. The ROM 201A and 201B emit digital information (voltage values in the embodiment), i.e. waveform data in response to the address signals based on the record information which is programmed beforehand.

Figure 14A:
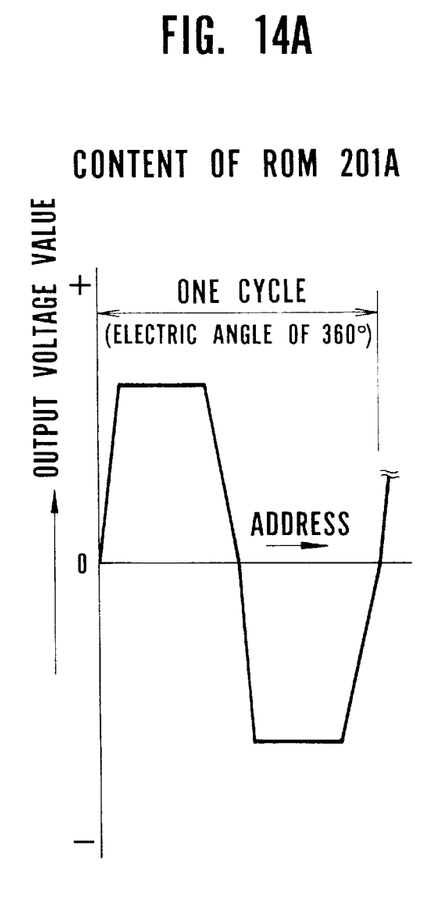
FIGS. 14A and 14B show a relationship between an address and an output voltage which is stored in ROM for use in the excitation voltage waveform generation circuit according to the invention.
Figure 14B:
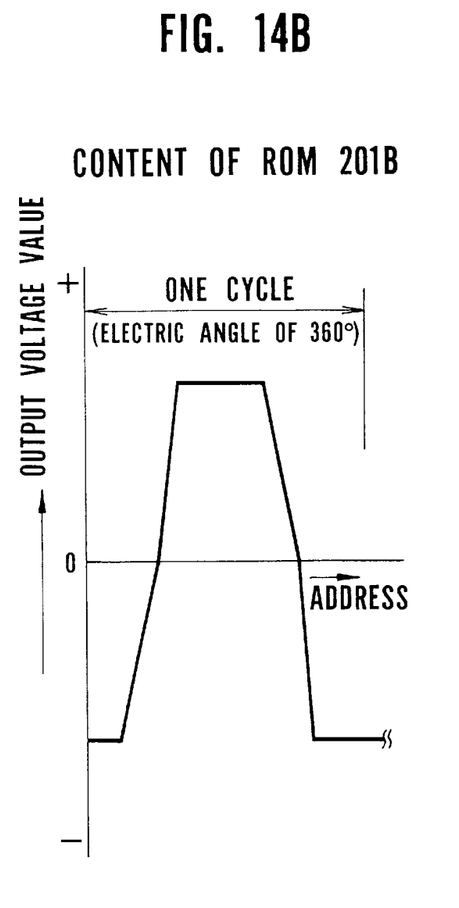

FIG. 14A shows a relationship between an address and an output voltage which is stored in the ROM 201A, while FIG. 14B shows a content of the ROM 201B.

As shown in FIGS. 14A and 14B, to prepare a smooth two-phase rotating magnetic field in the motor 7, the ROM 201A and 201B are each provided with the phase difference of 90 degrees in the electric angle. Each of the information stored in the ROM201A and 201B usually holds an electric angle of 360 degrees. By repeatedly reading the record information in each cycle of 360 degrees, a continuous voltage waveform is obtained. The record information can be compressed and recorded by using a symmetry of information. For example, when the information has a point symmetry at a position of 180 degrees in electric angle, the information of 180 degrees is stored in the ROM201A and 201B. The information from 0 to 180 degrees is taken as it is, and the information from 180 to 360 degrees can be emitted by changing the polarity. The digital information emitted from the ROM 201A and 201B are converted to analog voltages by the D/A converters 202A and 202B (referring to FIG. 13). The analog voltages are amplified in power by the power amplifiers 203A and 203B. Then, power is supplied to the coils 13 and 14 in the spindle motor 7. In this manner, by constituting the excitation voltage waveform generation circuit of the ROMs, one digital value (information) can be optionally associated with one address. As a result, an optional excitation voltage waveform can be prepared. The method of changing the voltage gradient of the excitation voltage rise/fall portion is not restricted to the aforementioned. Alternatively, in case of the square wave voltage drive, a capacitor is connected in parallel with the coils 13 and 14 in the motor 7 in such a manner that a voltage waveform generated therebetween satisfies the condition of the invention.

As aforementioned, FIGS. 14A and 14B show the excitation voltage patterns which are stored in the ROM201A and 201B as the examples of the unequal leg trapezoidal voltage waveform. In the same manner as FIG. 12, the positive rise voltage gradient is 20Vm·n·P (28.8V/ms), and the fall voltage gradient is 6.7Vm·n·P (9.65V/ms) (the negative rise and fall voltage gradients are the reverse of the positive gradients), which satisfy the aforementioned condition.

According to the invention, as aforementioned, for the spindle motor for driving the record disc of the information recording device the inexpensive synchronous motor (especially, the two-phase claw-pole stepping motor is effective) can be used. Further, just by appropriately setting the voltage gradient of the drive voltage waveform, the excitation noise superimposed on the reading/writing head of the drive can be effectively reduced without reducing the motor generation torque.

What is claimed is:

1. A motor drive method of a synchronous spindle motor for use in a record disc drive of an information recording device, the method comprising:

producing a rotating magnetic field at substantially equal pitches in an air gap by a stator winding having a number of poles P (poles); and applying an excitation voltage v(t) to the stator winding so as to drive said motor at a number of revolutions n(rps) relative to time t;

wherein said excitation voltage v(t) has a waveform which is not a sinusoidal waveform or a square wave but a continuous waveform which exists in a region bounded by the sinusoidal waveform and the square wave both having a maximum valve Vm(V) of a voltage amplitude and a synchronous frequency n·P/2 (Hz) and being equal to each other in phase, wherein said excitation voltage v(t) has a voltage gradient having an absolute value which does not exceed eight times the gradient of the sinusoidal commercial power supply waveform at a zero-crossing 8πVm·n·P(V/s), and wherein the voltage gradient before and after commutation of said excitation voltage v(t) has a maximum absolute value of 2πVm·n·P(V/s) or more.

2. The motor drive method according to claim 1 wherein a maximum absolute value of the voltage gradient of said excitation voltage v(t) is a rise or fall portion before and after the commutation of said voltage.

3. The motor drive method according to claim 1 wherein said excitation voltage v(t) has an equal leg trapezoidal waveform or an equal leg pan-bottom shaped waveform.

4. The motor drive method according to claim 1 wherein said excitation voltage v(t) has an unequal leg trapezoidal waveform or an unequal leg pan-bottom shaped waveform.

5. The motor drive method according to claim 4 wherein an average voltage gradient of a rise portion of the waveform of said excitation voltage v(t) is larger than an average voltage gradient of a fall portion.

6. The motor drive method according to claim 1 wherein said record disc drive is a floppy disc drive (FDD).

7. The motor drive method according to claim 1 wherein said motor has a permanent magnet on a rotor, and in said motor the number of poles P (poles) of said permanent magnet is equal to the number of poles of the rotating magnetic field produced in the air gap by one phase of the stator winding.

8. A motor drive circuit comprising:

a counter adapted to count up or down in response to a pulse of a revolution number command signal for commanding a motor revolution number;

a ROM, coupled with and receiving counter data from said counter, for emitting a waveform data in which an excitation voltage waveform in each phase is not a sinusoidal waveform or a square wave but a continuous waveform which exists between the sinusoidal waveform and the square wave both having a maximum value Vm(V) of a voltage amplitude and a synchronous frequency n·P/2(Hz) and being equal to each other in phase, wherein said excitation voltage waveform has a voltage gradient having an absolute value not exceeding eight times the gradient of the sinusoidal commercial power supply waveform at a zero-crossing 8πVm·n·P(V/s); and means, coupled with said ROM, for producing an excitation voltage with said waveform to be applied to a stator winding of said motor based on said waveform data transmitted from said ROM.

* * * * *